Oct. 9, 1956  W. CAMBEIS ET AL  2,765,782
TWO-STROKE CYCLE ENGINE WITH UNIFLOW SCAVENGING
Filed July 28, 1953  3 Sheets-Sheet 1

Oct. 9, 1956  W. CAMBEIS ET AL  2,765,782
TWO-STROKE CYCLE ENGINE WITH UNIFLOW SCAVENGING
Filed July 28, 1953  3 Sheets-Sheet 2

INVENTOR.
WALTER CAMBEIS
KURT HAASE
BY

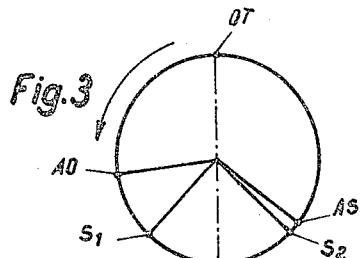
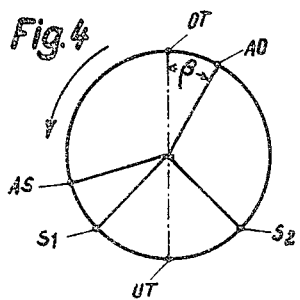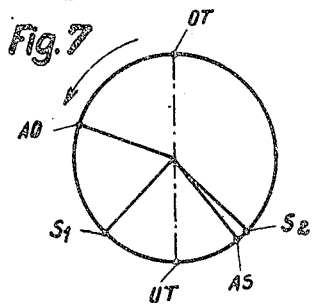
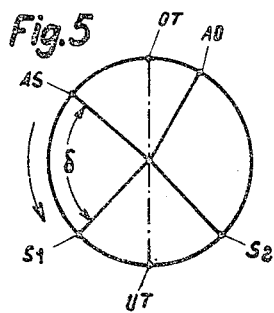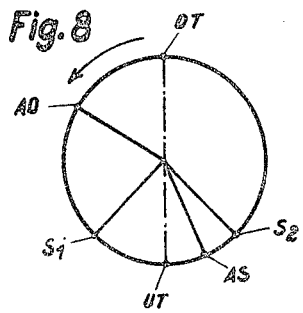
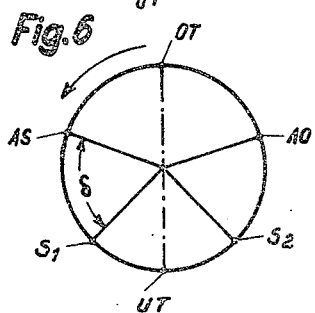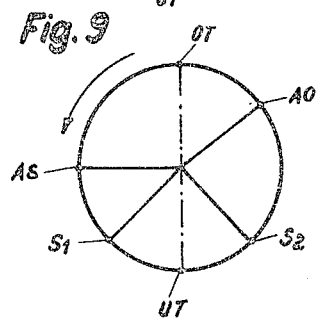

United States Patent Office 2,765,782
Patented Oct. 9, 1956

2,765,782

TWO-STROKE CYCLE ENGINE WITH UNIFLOW SCAVENGING

Walter Cambeis, Essen-Bredeney, and Kurt Haase, Essen, Germany, assignors to Sudwerke Motoren- und Kraftwagenfabriken G. m. b. H., Essen, Germany Application July 28, 1953, Serial No. 370,824

Claims priority, application Germany August 4, 1952

3 Claims. (Cl. 123—65)

In the co-pending application Ser. No. 311,432, filed September 25, 1952, and now Patent No. 2,705,480, there is described a two-stroke cycle engine for vehicles which has uniform scavenging while employing rotating control means for controlling the discharge opening or openings of the cylinder. These control means are adapted to be adjusted during their rotation, and solely as a result of this adjusting movement, the start of the opening of the outlet member or members may be varied within a range extending from the normal start of the opening to at least approximately the top dead center. Such adjusting or rotating control means may consist of a cam shaft arranged to control the discharge valves located in the cylinder heads. If desired, also rotary valves mounted in the cylinder heads may be used as control members for controlling the discharge of gases from the cylinder. These rotary valves are driven by the crankshaft. As a result of the aforesaid turning or adjustment of the control means, a braking action is exerted upon the engine. This braking action may be varied within wide limits and is very effective at high speeds. The engine according to the above mentioned co-pending patent application makes it possible to drive heavy trucks, especially trucks with trailers, on long declines at considerably higher speeds than was possible with the braking means heretofore customary.

It is an object of this invention, further to improve the control of the discharge valve means so as to increase the braking effect and to allow adjustment of the control means for facilitating starting and cranking of the engine.

It is also an object of this invention to improve the actuation of the control means in such a manner that they can be turned in their direction of rotation by a greater angle relative to the driving means therefor than it is possible with the arrangement according to the co-pending application Ser. No. 311,432 above referred to. These and other objects and advantages of the invention will appear more clearly from the following specification in connection with the accompanying drawings in which:

Figs. 3 to 9 represent various diagrams concerning the control method according to the invention.

While according to the above mentioned co-pending patent application, the starting point of the opening of the outlet means is displaceable up to about top dead center by turning the control members, according to the present invention the control members are rotatable to such an extent that the starting point of the opening of the outlet means may be displaced in such a manner that it will be located considerably ahead of the top dead center as will be clear from the following specification.

Figures 1, 1A:
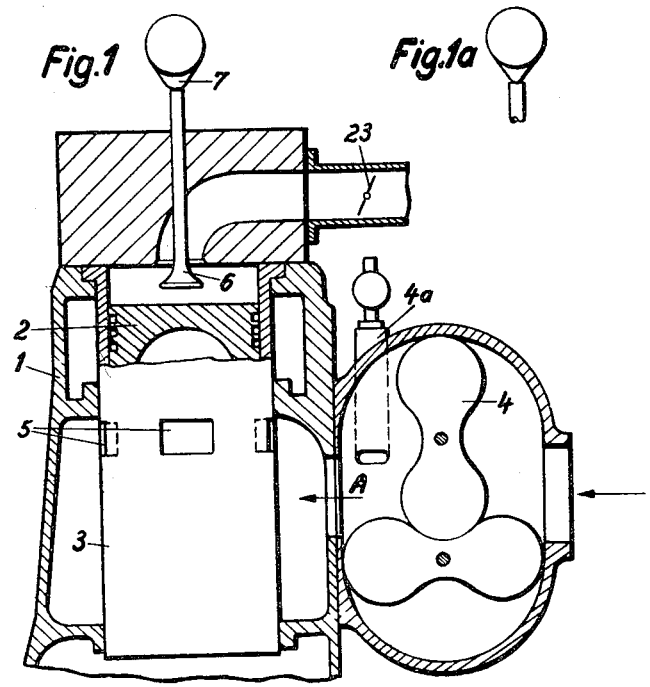
Fig. 1 illustrates a cross-section through an engine for use in connection with the present invention.
Fig. 1a illustrates a reduced cam for facilitating the improved control method according to the invention.

Referring first to Fig. 1, the engine shown therein comprises a cylinder 1 having a liner 3 mounted therein within which a piston 2 is reciprocably mounted. The arrangement furthermore comprises a blower 4 provided with a safety or pressure relief valve 4a. The blower delivers scavenging air and feeds the same in the direction of the arrow A while pressing the air through the slots 5 in the cylinder liner 3 into the cylinder when the piston 2 uncovers the slots during its downward movement. The scavenging air then escapes, during normal operation of the engine, through the discharge valve 6 which is located in the cylinder head and is controlled by the cam 7 on the cam shaft 8 (see Fig. 2).

The cam shaft 8 has an extension 9 on which a sleeve 10 is mounted so as to be axially movable on said extension. A key 11 prevents the sleeve 10 from rotating relative to the extension or shaft portion 9. The sleeve 10 has a multiple quick pitch screw thread 12 which meshes with a corresponding inner thread of a pinion 13. This pinion is mounted in the casing 14 in such a manner that it cannot move in axial direction, whereas it is adapted to be rotated by a pinion 15 meshing with the pinion 13 which is driven by the crank shaft. The free end of the sleeve 10 is provided with an annular groove 16 which is engaged by a control lever 18 which is pivotally mounted at 17.

Figure 2:
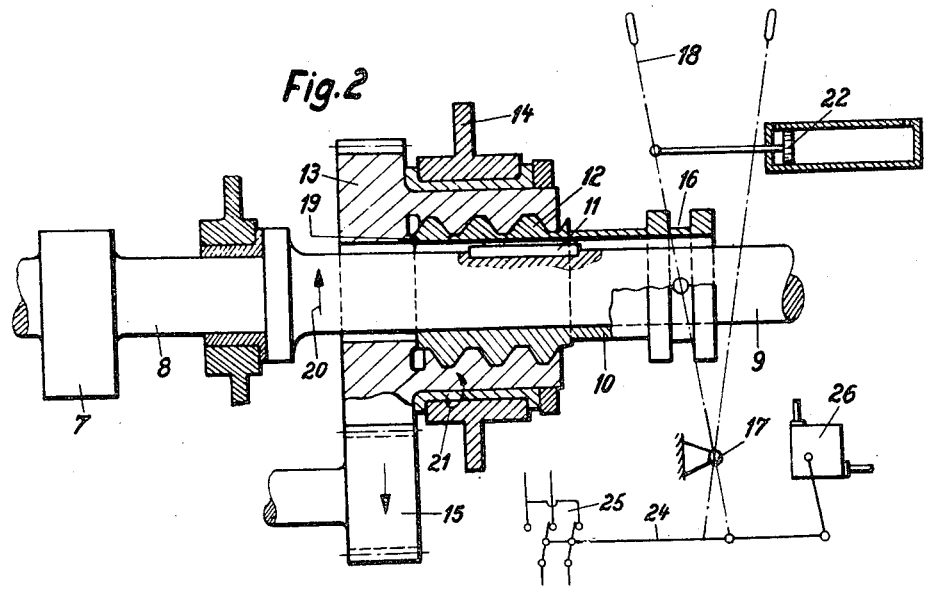
Fig. 2 shows, partly in section, a device for adjusting the cam shaft pertaining to the engine of Fig. 1.
Figure 1B:
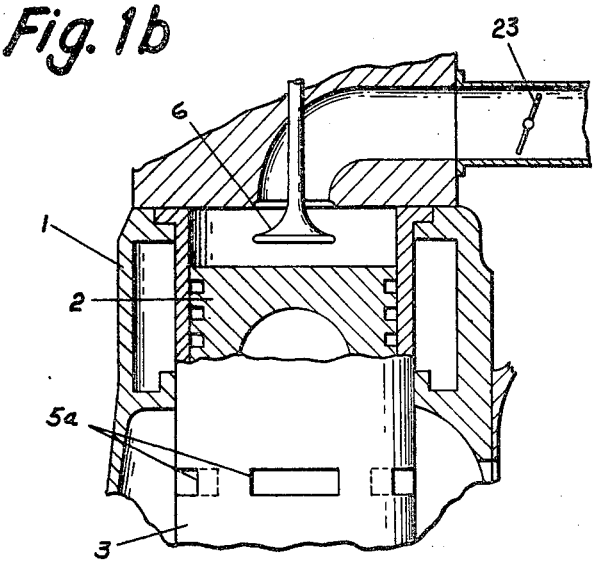
Fig. 1b is a slight modification of Fig. 1 inasmuch as the scavenging inlet slots are arranged at a considerably lower level than is the case in Fig. 1.
Figure 2A:
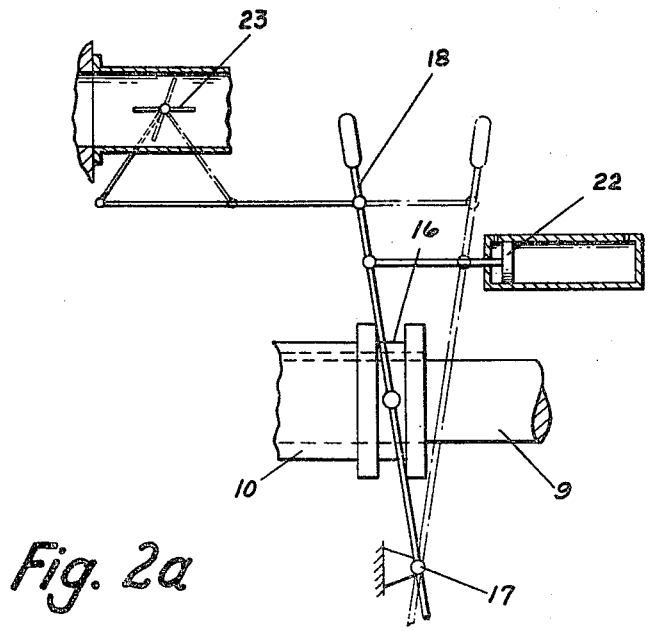
Fig. 2a shows a control arrangement for automatically making a throttle effective in connection with certain adjustments of the device according to the invention.

Fig. 2 shows the sleeve 10 in such a position that its left hand end face abuts the adjacent face 19 of the pinion 13. This position represents the position which the sleeve 10 occupies during the normal operation of the engine. In order to bring about a braking action, the control lever 18 is moved toward the right (with regard to Fig. 2). As a result thereof, the sleeve 10 is, to a certain extent, pulled out of the inner thread of the pinion 13 and is simultaneously rotated in conformity with the pitch of the thread 12, thereby causing a corresponding rotation of the cam shaft 8. The direction of rotation of the cam shaft 8 is indicated by the arrow 20. The pinion 13 rotates in the same direction as has been indicated by the arrow 21.

According to the present invention the pitch of the thread 12 is so selected that the rotatable pinion 13 has the tendency to move the sleeve 10 toward the left with regard to Fig. 2, in other words, has the tendency to return the sleeve 10 from its braking position into the normal driving position illustrated in Fig. 2. Consequently, if at the time the engine was stopped, the cam shaft occupied its braking position, the cam shaft will automatically be returned into its normal driving position when the motor is being started. While the control lever 18 may be actuated manually, it is, of course, understood that the actuation of the control lever 18 may be brought about hydraulically or pneumatically, for instance, by a cylinder piston arrangement 22 operable by pressure fluid means and operatively connected to the lever 18.

Referring now to the various diagrams illustrated in Figs. 3 to 9, the following designations have been selected:

T. D. C.=top dead center;
B. D. C.=bottom dead center;
$S_1$=starting point of the opening of the scavenging air inlet slots;
$S_2$=end of the closing of the slots;
AO=starting point of the opening of the outlet means;
AS=end of the closing of the outlet means;

The arrows indicate the direction of rotation of the engine.

The crank circle diagram of Fig. 3 illustrates the conditions for the normal driving operation of the engine, i. e. when using the engine as a prime mover. As will be clear from this diagram, the opening of the exhaust means starts at a point AO which for instance may be located approximately 85° ahead of the bottom dead center B. D. C. The closing point AS of the discharge means is located shortly behind the point $S_2$ which indicates the closure of the scavenging air inlet slots.

According to the present invention, as illustrated in the diagram of Fig. 4, the control members are adjusted in such a manner that the point at which the exhaust means begin to open is located at AO which lies ahead of the point T. D. C., which indicates the top dead center, by an angle $\beta$. This angle may, for instance, be approximately 30° so that the cam shaft or the rotary valve in the particular example illustrated would have to be rotated in the direction of rotation by approximately 125° with regard to the driving means therefor.

It has been found that if according to the diagram of Fig. 4 the opening of the outlet means is initiated at a certain time or a certain distance ahead of the top dead center, the piston will perform a maximum compression work. It will be appreciated that due to the early opening of the exhaust means, the compressed air during the upward stroke of the piston practically completely escapes from the cylinder so that during the subsequent downward stroke of the piston the previously performed compression work is not regained. Therefore, in this way, a braking effect is obtained which is considerably greater than the braking effect obtained according to the method of the above referred to co-pending patent application Ser. No. 311,432, now Patent No. 2,705,480. Consequently, according to the present invention, also at medium and low driving speeds a satisfactory braking of the engine is obtainable. Therefore, also when driving in a city, the engine can effectively be operated as compressor for purposes of braking.

The braking effect may still further be increased if during the downward stroke of the piston, the exhaust means are closed considerably earlier than the uncovering of the scavenging air inlet slots is effected by the piston, as illustrated in the diagram of Fig. 5. With reference to this diagram, it is assumed that the control means have been rotated in the direction of rotation by the same angle as according to the diagram of Fig. 4 so that the point AO is spaced from the top dead center point T. D. C. by approximately the same distance as is the case in the diagram of Fig. 4. According to Fig. 5 the exhaust means, however, are closed considerably earlier than is the case according to the diagram of Fig. 4. For instance, according to Fig. 5, the point AS is located only approximately 50° past the point T. D. C. Accordingly, the scavenging air inlet slots are uncovered only after the discharge means have been closed for a considerable time. Thus, for instance, the point $S_1$ may be spaced from the point AS by an angle $\delta$ of approximately 80°. The arc AS—$S_1$ corresponds in view of its location in the crank circle to a relatively large piston stroke. Consequently, when the piston moves downwardly, it will create a considerable sub-atmospheric pressure in the time interval between the closing of the exhaust means and the uncovering of the scavenging air inlet slots. In other words the piston has to perform additional work which will not be regained because the said subatmospheric pressure in the cylinder will be neutralized as soon as the scavenging air inlet slots have been uncovered. This additional work performed during the downward stroke of the piston has to be added to the work which the piston has to perform during the compression stroke (from $S_2$ to AO) so that the total work performed results in an increased braking effect. As will be clear from the above, it is essential to make the angular distance between the points AS and $S_1$ as great as possible. This may be done, for instance, by reducing the cam of the cam shaft controlling the discharge valve means, thereby reducing the angle between the points AO and AS to a minimum. However, if desired, also the angle between the points $S_1$ and $S_2$ may be reduced to a minimum by arranging the scavenging air inlet slots as far downwardly as possible so that the said slots will be released at a rather late time. To this end, however, it is necessary to give said slots a sufficiently large cross-section so as to make it possible that during the now shortened opening time of the slots the necessary quantity of scavenging air will pass through said slots. Advantageously the above mentioned two expedients are employed simultaneously. Fig. 1 illustrates in dot dash lines scavenging inlet slots $5a$ which have been arranged considerably lower than the slots 5 as will be clear from the drawing.

Fig. 1$a$ shows a reduced cam by means of which the angle between the points AO and AS may be reduced to a minimum.

In some circumstances, however, it is not permissible to employ the expedients mentioned above for increasing the angle between the points AS and $S_1$, at least not to the degree it would be necessary, because otherwise the normal operation of the engine as prime mover would be unfavorable. In such an instance, an increase in the angle between the points AS and $S_1$ may also be obtained by adjusting the control members in the direction of rotation still farther than has been provided according to the diagram of Fig. 4 (see Fig. 6). However, in this way the exhaust means begin to open such a distance ahead of the top dead center point that without resorting to additional steps, no satisfactory compression would be obtained during the upward stroke of the piston so that the braking effect during the upward stroke of the piston would be reduced. Such additional steps may according to the invention consist in the provision of a choke member 23 which, when changing the operation of the engine as prime mover to the operation of the engine as compressor, will automatically become effective simultaneously with the increased adjustment of the control members in conformity with the diagram of Fig. 6. In this way, also after the early uncovering of the exhaust means (point AO in diagram of Fig. 6) the pressure in the cylinder will still increase so that the piston will perform a satisfactory compression work during its upward stroke. When again operating the engine as prime mover, the choke member will automatically be made ineffective.

The present invention also comprises a method for facilitating the starting of a two-stroke cycle engine of the type referred to above. To this end, the control members are not adjusted in their direction of rotation to such an extent as may be the case when a braking action is desired. Instead the adjustment is effected only to such an extent that the exhaust means will close prior to the covering up of the scavenging air inlet slots by the upwardly moving piston. As will be clear from the diagram of Fig. 7, the point AS will then be located in the direction of rotation close to and ahead of the point $S_2$. In view of this advancement of the closure point of the exhaust means, an increased compression will be obtained so that the motor will start easier.

When making use of this starting expedient, it is possible to design the engine for a lower compression ratio which, however, will be sufficient to bring about ignition during the normal operation of the engine as prime mover. The ignition under the more difficult conditions is then obtained during the starting period at any rate due to the above mentioned adjustment for a higher compression ratio brought about by the adjustment of the control members according to the diagram of Fig. 7. Furthermore, the invention also makes it possible in a very simple manner to bring about a supercharging of the engine. To this end, as illustrated in the diagram of Fig. 8, the control members are adjusted in the direction of rotation still further than is the case according to the diagram of Fig. 7 so that the exhaust means will be covered up still earlier ahead of the covering up of the scavenging air inlet slots. Due to the early covering up of the exhaust valve means, the compression starts at point $S_2$ with an increased starting pressure so that a maximum engine output is obtained.

In addition thereto, the invention also makes it possible by adjusting the control members either in the direction of rotation or in the opposite direction, to facilitate the cranking of the engine while the fuel supply is interrupted. This is of particular importance when installing or repairing the engine. In order to facilitate this cranking, the closure point of the exhaust means is as illustrated in the diagram of Fig. 9 located at a point at which the piston has moved approximately over half its stroke so that when cranking the engine, the total work to be performed by the piston during its upward and downward stroke is reduced to a minimum.

By adjusting the control members in a direction counter to the normal direction of rotation of the engine, it is possible in the case of a reversal of the direction of rotation to obtain the same control periods as during the previous direction of rotation. In such an instance there is preferably provided a coupling 24 between the adjusting device and a device for reversing the poles of the starter and of devices 26 for adjusting the fuel pump and possibly of other auxiliary drives in conformity with the new direction of rotation.

The invention is not limited to the application for vehicle motors but may also be employed in connection with stationary engines as well as engines for ships. It is also to be understood that the invention is not limited to the application of all of the described operational possibilities as an entirety but also comprises the use of the individual operational possibilities.

It is furthermore to be understood that the present invention is by no means limited to the particular arrangement and methods described in the preceding description and shown in the drawings but also comprises any modification with the scope of the appendant claims.

What we claim is:

1. A two-stroke cycle internal combustion engine with uniflow scavenging, which comprises in combination: a cylinder having air inlet port means for admitting scavenging air and having air outlet port means for exhausting scavenging air, a piston reciprocably mounted in said cylinder and controlling said air inlet port means, valve means operable to control said air outlet port means, rotatable control means arranged for controlling said valve means, and adjusting means operatively connected to said control means and operable selectively during rotation of said control means rotatably to adjust said control means with regard to said valve means so as to cause said valve means to open said outlet port means during its compression stroke after the piston has passed through approximately half its compression stroke but substantially 30° prior to said piston reaching its top dead center during said compression stroke.

2. A two-stroke cycle internal combustion engine with uniflow scavenging, which comprises in combination: a cylinder having air inlet port means for admitting scavenging air and having air outlet port means for exhausting scavenging air, a piston reciprocably mounted in said cylinder and controlling said air inlet port means, valve means operable to control said air outlet port means, rotatable control means arranged for controlling said valve means, and adjusting means operatively connected to said control means and operable selectively during rotation of said control means rotatably to adjust said control means with regard to said valve means from its normal position of operation past the top dead center of the piston to a plurality of positions from approximately 30° to 80° ahead of said top dead center for selectively producing an increased braking effect or facilitating the cranking of said engine.

3. A two-stroke cycle internal combustion engine with uniflow scavenging, which comprises in combination: a cylinder having air inlet port means for admitting scavenging air and having air outlet port means for exhausting scavenging air, a piston reciprocably mounted in said cylinder and controlling said air inlet port means, valve means operable to control said air outlet port means, rotatable control means arranged for controlling said valve means, adjusting means operatively connected to said control means and operable selectively during rotation of said control means rotatably to adjust said control means with regard to said valve means so as to cause said valve means to open said outlet port means during its compression stroke after the piston has passed through approximately half its compression stroke but substantially 80° prior to said piston reaching its top dead center during said compression stroke, outlet conduit means communicating with said outlet port means for exhausting the scavenging air exhausted through said outlet port means, and throttle means arranged within said outlet conduit means and movably connected with said adjusting means for throttling the exhaust through said conduit means in response to the adjustment of said adjusting means into position for opening said valve means at substantially 80° prior to said piston reaching its top dead center during said compression stroke.

References Cited in the file of this patent

UNITED STATES PATENTS

| | | |
|---|---|---|
| 1,149,745 | Fay | Aug. 10, 1915 |
| 1,745,824 | Zoller | Feb. 4, 1930 |
| 1,947,996 | Loeffler | Feb. 20, 1934 |
| 2,148,854 | Bokemuller | Feb. 28, 1939 |
| 2,198,247 | Grob | Apr. 23, 1940 |
| 2,440,336 | Hill | Apr. 27, 1948 |
| 2,705,480 | Cambeis et al. | Apr. 5, 1955 |

FOREIGN PATENTS

| | | |
|---|---|---|
| 159,923 | Germany | Apr. 14, 1905 |